(12) United States Patent
Hiatt, Jr. et al.

(10) Patent No.: US 7,480,351 B2
(45) Date of Patent: Jan. 20, 2009

(54) TECHNIQUE FOR DEMODULATING LEVEL II HIERARCHICAL DATA

(75) Inventors: Michael L. Hiatt, Jr., Westfield, IN (US); Eric A. DiBiaso, Kokomo, IN (US); Glenn A. Walker, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 621 days.

(21) Appl. No.: 11/268,120

(22) Filed: Nov. 7, 2005

(65) Prior Publication Data

US 2007/0104293 A1   May 10, 2007

(51) Int. Cl.
*H03D 3/22* (2006.01)
(52) U.S. Cl. .................................. 375/332; 375/280
(58) Field of Classification Search ......... 375/329–333, 375/279–283
See application file for complete search history.

(56) References Cited

U.S. PATENT DOCUMENTS

| | | | |
|---|---|---|---|
| 7,221,719 B2* | 5/2007 | Shiraishi et al. | 375/326 |
| 2005/0157822 A1* | 7/2005 | Khandekar et al. | 375/340 |
| 2006/0045211 A1* | 3/2006 | Oh et al. | 375/329 |

* cited by examiner

*Primary Examiner*—Kevin Y Kim
(74) *Attorney, Agent, or Firm*—Jimmy L. Funke (57) ABSTRACT

A technique for demodulating secondary data from a hierarchically modulated signal includes a number of steps. A gray coded eight phase shift key (8-PSK) hierarchically modulated signal is received that includes primary data and secondary data. An imaginary portion of the signal is determined and a real portion of the signal is determined. An absolute value of the real portion of the signal may then be subtracted from an absolute value of the imaginary portion of the signal to provide the secondary data. The gray coded 8-PSK hierarchically modulated signal may be a uniform gray coded 8-PSK hierarchically modulated signal or a non-uniform gray coded 8-PSK hierarchically modulated signal.

28 Claims, 7 Drawing Sheets

TECHNIQUE FOR DEMODULATING LEVEL II HIERARCHICAL DATA

TECHNICAL FIELD

The present invention is generally directed to the reception of digital data and, more particularly, to a technique for demodulating Level II data from a hierarchically modulated data stream.

BACKGROUND OF THE INVENTION

Various communication systems experience bandwidth limitations. For example, recently, the Federal Communication Commission (FCC) allocated twelve and one-half (12.5) MHz of the electromagnetic spectrum for satellite digital broadcasting to XM Satellite Radio, Inc. of Washington, D.C. (XM) and 12.5 MHz of the electromagnetic spectrum to Sirius Satellite Radio, Inc. of New York City, N.Y. (Sirius). Both satellite digital audio radio (SDAR) system companies provide subscription-based digital audio that is transmitted from communication satellites, and the services provided by these and other SDAR companies are capable of being transmitted to both mobile and fixed receivers on the ground.

In order to improve satellite coverage reliability and performance, SDAR systems currently use three (3) techniques that represent different kinds of redundancy (known as diversity). The techniques include spatial diversity, time diversity and frequency diversity. Spatial diversity refers to the use of two (2) satellites transmitting near-identical data from two (2) widely-spaced locations. Time diversity is implemented by introducing a time delay between otherwise identical data and frequency diversity includes the transmission of data in different frequency bands. SDAR systems may utilize one, two or all of the techniques. The limited allocation of twenty-five (25) megahertz (MHz) of the electromagnetic spectrum for satellite digital broadcasting has created a need in the art for a technique that increases the amount of data that may be transmitted from communication satellites to receivers in SDAR systems.

Hierarchical modulation (HM) has been designated as an alternative to the conventional modulation methods (e.g., QPSK, 16-QAM and 64-QAM) for digital video broadcasting-terrestrial (DVB-T). In a system that utilizes HM, autonomous DVB-T multiplexes are transmitted on a single TV frequency channel. HM has also been implemented in other communication systems. Unfortunately, the implementation of HM within a communication system has generally required complex receivers to demodulate the extra secondary (Level II) data. One solution for demodulating secondary data has been to demodulate/decode the primary data stream, re-encode/re-modulate the primary data stream and subtract the primary data stream from the received data stream to provide the secondary data.

Another method to demodulate secondary data from a received data stream has required taking a distance measurement of a received constellation point from four points on the real/imaginary (I/Q) plane. It should be appreciated that the distance measurement requires multiplication, subtraction and implementation of a square root function. Yet another technique has required demodulation/decoding of a primary data stream. The primary data is then re-encoded and is then utilized as a new offset detection boundary. Unfortunately, all the described techniques for demodulating secondary data have required relatively complex receivers.

What is needed is a technique for demodulating secondary data associated with a hierarchically modulated data stream that reduces the complexity of a receiver.

SUMMARY OF THE INVENTION

According to one embodiment of the present invention, a technique for demodulating secondary data from a hierarchically modulated signal includes a number of steps. Initially, a gray coded eight phase shift key (8-PSK) hierarchically modulated signal is received that includes primary data and secondary data. Then, an imaginary portion of the signal is determined and a real portion of the signal is determined. An absolute value of the real portion of the signal may then be subtracted from an absolute value of the imaginary portion of the signal to provide the secondary data. The gray coded 8-PSK hierarchically modulated signal may be a uniform gray coded 8-PSK hierarchically modulated signal or a non-uniform gray coded 8-PSK hierarchically modulated signal.

According to one aspect, the secondary data is low priority data and the primary data is high priority data. According to another embodiment, a digital one (zero) is indicated when the absolute value of the imaginary portion of the signal is greater than the absolute value of the real portion of the signal and a digital zero (one) is indicated when the absolute value of the imaginary portion of the signal is less than the absolute value of the real portion of the signal.

These and other features, advantages and objects of the present invention will be further understood and appreciated by those skilled in the art by reference to the following specification, claims and appended drawings.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the various aspects of the present invention. The exemplifications set out herein illustrate exemplary embodiments of the present invention in several forms and such exemplification is not to be construed as limiting the scope of the invention in any manner.

DESCRIPTION OF THE PREFERRED EMBODIMENTS

The embodiments disclosed below are not intended to be exhaustive or limit the invention to the precise forms disclosed in the following detailed description. Rather, the embodiments are chosen and described so that others skilled in the art may utilize their teachings.

For the purposes of the present invention, certain terms shall be interpreted in accordance with the following definitions.

"Feed forward correction" is a method of improving secondary data (defined infra) detection. By knowing the relative "I" (in-phase) and "Q" (quadrature) components of a constellation quadrant, a detector may be enhanced to better perform by having a priori knowledge to assist detection.

"First level data," "primary data" and/or "Level I data" refers to data that may be interpreted by current (i.e., "legacy") SDAR receivers. Because the first level data can be interpreted by the legacy receivers, the first level data may also be considered to have backwards compatibility.

"Hierarchical modulation" describes when two separate data or bit streams are modulated onto a single data stream. Essentially, an additional data stream is superimposed upon, mapped on, or embedded within the primary data transmission. The additional data stream may have a different data rate than the primary data stream. As such, the primary data is more susceptible to noise than it would be in a non-hierarchical modulation scheme. By using a different coding algorithm, the usable data of the additional stream may be transmitted with a different level of error protection than the primary data stream. Broadcasters of SDAR services may use the additional and primary data streams to target different types of receivers.

"Legacy receiver" describes a current or existing SDAR receiver that is capable of interpreting first level data. Legacy receivers typically interpret second level data as noise.

"Second generation receiver" describes a SDAR receiver that contains hardware and/or software enabling the receiver to interpret second level data (e.g., demodulator enhancements). Second generation receivers may also interpret first level data.

"Second level data," "secondary data," "Level II data" and/or "hierarchical data" refers to additional data that is superimposed on first level data to create a hierarchically modulated data stream. Second level data may be interpreted by SDAR receivers containing the appropriate hardware and/or software to facilitate such interpretation (i.e., "second generation" receivers). Level II, or secondary, data may perform differently from first level, or primary, data.

Quadrature amplitude modulation (QAM) is one form of multilevel amplitude and phase modulation that is often employed in digital data communication systems. Using a two-dimensional symbol modulation composed of a quadrature (orthogonal) combination of two (2) pulse amplitude modulated signals, a QAM system modulates a source signal into an output waveform with varying amplitude and phase. Data to be transmitted is mapped to a two-dimensional, four-quadrant signal space, or constellation. The QAM constellation employs real (I) and imaginary (Q) components to signify the in-phase and quadrature components, respectively. The constellation also has a plurality of phasor points, each of which represent a possible data transmission level. Each phasor point is commonly called a "symbol," represents both I and Q components and defines a unique binary code. An increase in the number of phasor points within the QAM constellation permits a QAM signal to carry more information.

Many existing communication systems utilize quadrature phase shift key (QPSK) modulation. In such QPSK systems, a synchronous data stream is modulated onto a carrier frequency (before transmission over the satellite channel) and the carrier can have four (4) phase states, e.g., 45 degrees, 135 degrees, 225 degrees or 315 degrees. Thus, similar to QAM, QPSK employs quadrature modulation where the phasor points can be uniquely described using the I and Q axes. In contrast to QAM, however, the pair of coordinate axes in QPSK can be associated with a pair of quadrature carriers with a constant amplitude, thereby creating a four (4) level constellation, i.e., four (4) phasor points having a phase rotation of 90 degrees. Differential quadrature phase shift key (D-QPSK) refers to the procedure of generating the transmitted QPSK symbol by calculating the phase difference of the current and the preceding QPSK symbol. Therefore, a non-coherent detector can be used for D-QPSK because it does not require a reference in phase with the received carrier.

Figure 1:
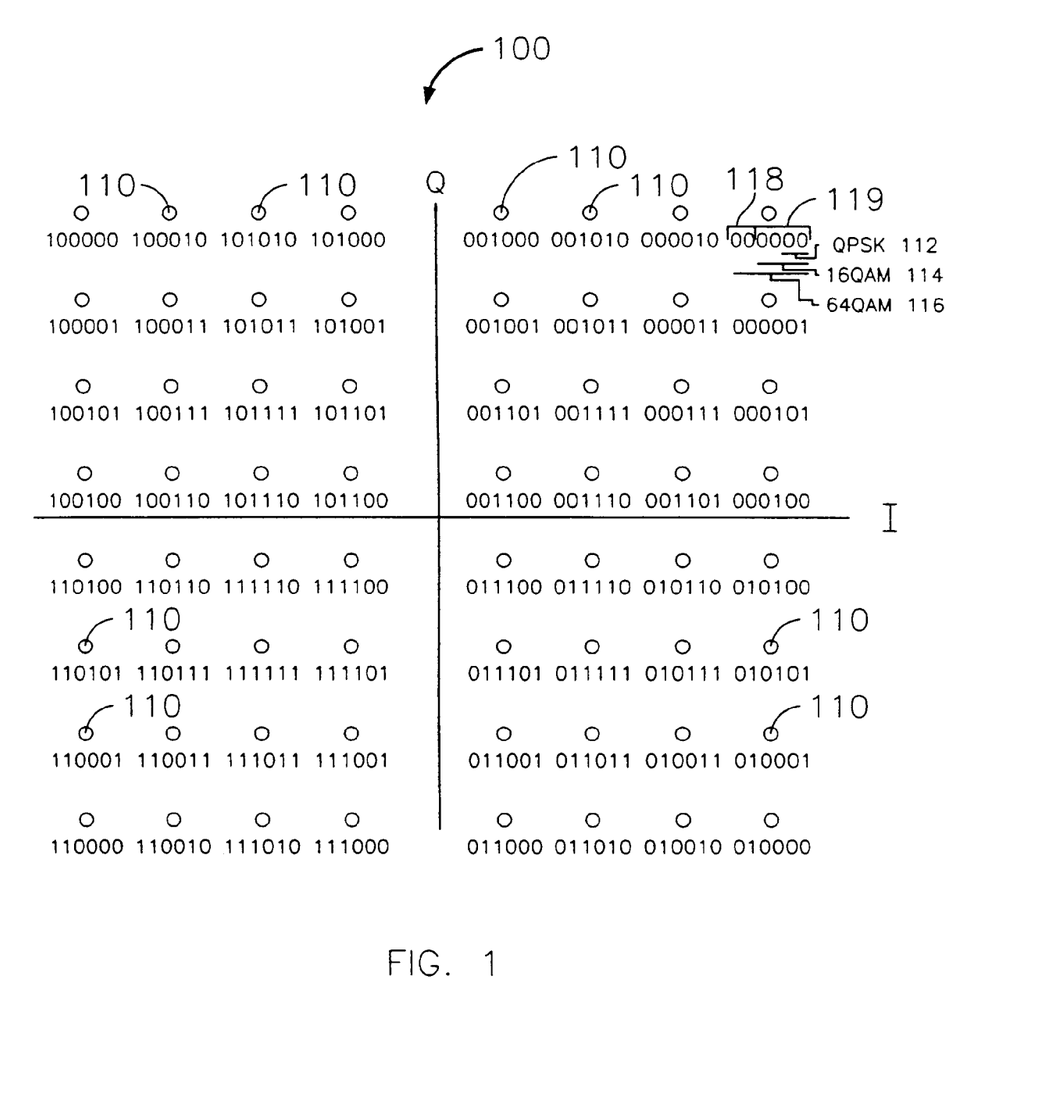
FIG. 1 is an illustrative view of a constellation chart for 64-quadrature amplitude modulation (QAM) with an embedded quadrature phase shift key (QPSK) stream.

Hierarchical modulation, used in DVB-T systems as an alternative to conventional QPSK, 16-QAM and 64-QAM modulation methods, may better be explained with reference to FIG. 1. FIG. 1 illustrates a 64-QAM constellation 100. Each permissible digital state is represented by phasors 110 in the I/Q plane. Since eight (8) by eight (8) different states are defined, sixty-four (64) possible values of six (6) bits may be transmitted in 64-QAM constellation 100. FIG. 1 shows the assignment of binary data values to the permissible states. In a 16-QAM constellation, there are four (4) by four (4) different states and four (4) transmitted bits. In a 4-PSK (QPSK) constellation, there are two (2) by two (2) states and two (2) transmitted bits and in a binary phase shift key (BPSK) constellation there is one (1) state and one (1) transmitted bit.

In systems employing hierarchical modulation schemes, the possible states are interpreted differently than in systems using conventional modulation techniques (e.g., QPSK, 16-QAM and 64-QAM). By treating the location of a state within its quadrant and the number of the quadrant in which the state is located as a priori information, two separate data streams may be transmitted over a single transmission channel. FIG. 1 shows how a 64-QAM constellation 100, upon which is mapped data transmitted at six (6) bits/symbol 116, may be interpreted as including a QPSK constellation 112 (which includes mapped data transmitted at two (2) bits/symbol) combined with a 16-QAM constellation 114 (which includes mapped data transmitted at four (4) bits/symbol). The combined bit rates of QPSK and the 16-QAM data steams is equal to the bit rate of the 64-QAM data stream.

In systems employing hierarchical modulation schemes, one (1) data stream is used as a secondary data stream while the other is used as a primary data stream. The secondary data stream typically has a lower data rate than the primary stream. Again referring to FIG. 1, using this hierarchical modulation scheme, the two (2) most significant bits 118 may be used to transmit the secondary data to second generation receivers while the remaining four (4) bits 119 may be used to code the primary data for transmission to the legacy receivers.

Figure 2:
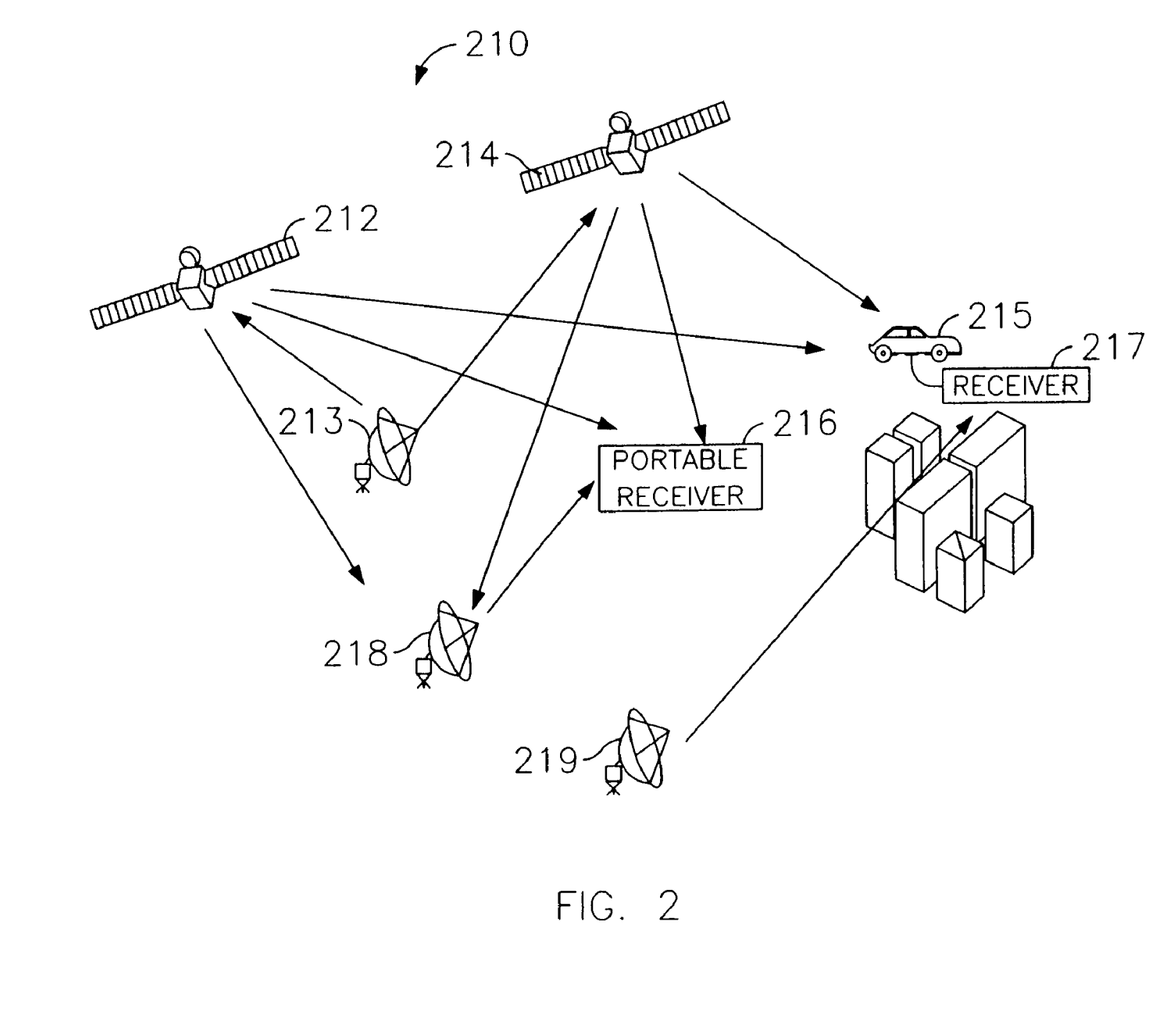
FIG. 2 is a diagrammatic view of an exemplary communication system, e.g., a satellite digital audio radio (SDAR) system, that may implement various embodiments of the present invention.

The present invention contemplates the use of hierarchical modulation in a SDAR or other communication system, while maintaining backward compatibility for legacy receivers. Shown in FIG. 2 is a diagrammatic view of an exemplary SDAR system 210 in which a hierarchical modulation scheme is employed. The SDAR system 210 includes first and second communication satellites 212 and 214, which transmit line-of-sight signals to SDAR receivers 216 and 217 (located on the earth's surface). The satellites 212 and 214 may provide for spatial, frequency and time diversity. As shown, the receiver 216 is a portable receiver, such as a handheld radio or wireless device, and the receiver 217 is a mobile receiver for use, for example, in a motor vehicle 215. The SDAR receivers 216 and 217 may also be stationary receivers for use in a home, office or other non-mobile environment.

The SDAR system 210 further includes a plurality of terrestrial repeaters 218 and 219, which receive and retransmit the satellite signals to facilitate reliable reception in geographic areas where the satellite signals are obscured from the view of the receivers 216 and 217 by obstructions, such as buildings, mountains, canyons, hills, tunnels, etc. The signals transmitted by the satellites 212 and 214 and the terrestrial repeaters 218 and 219 are received by receivers 216 and 217, which either combine or select one of the signals to output.

Figure 3:
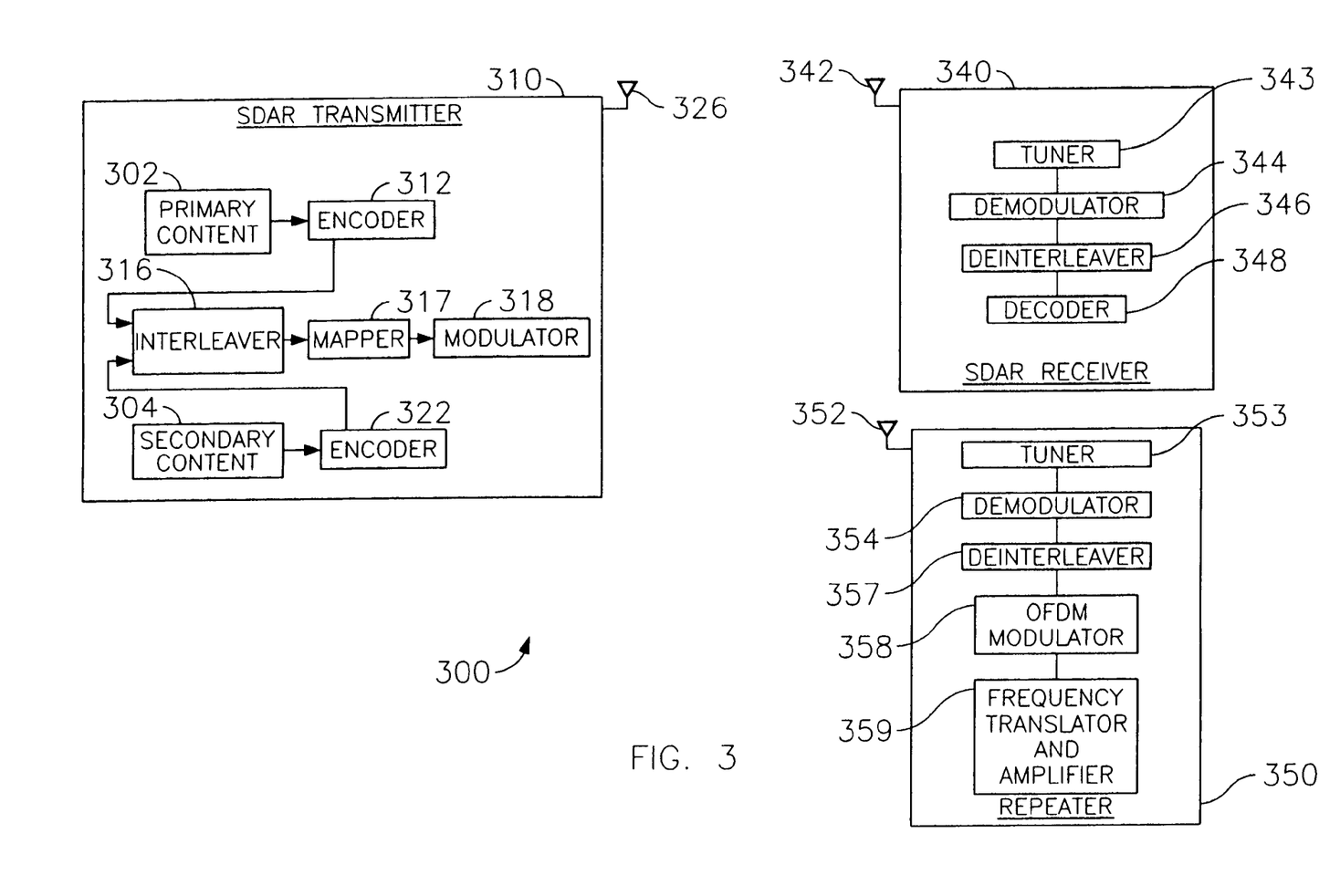
FIG. 3 is a block diagram of an exemplary SDAR communication system including an SDAR receiver configured to recover secondary data, according to various aspects of the present invention.

FIG. 3 is a block diagram of an exemplary SDAR communication system 300 in which hierarchical modulation is utilized. The SDAR communication system 300 includes SDAR transmitter 310, SDAR receiver 340 and terrestrial repeater 350. As in conventional SDAR communication systems, the SDAR communication system 300 inputs primary data 302 and secondary data 304 and performs processing and frequency translation within the transmitter 310. The digital data is transmitted over a transmission channel to the receiver 340 and/or the terrestrial repeater 350. Generally, the receiver 340 performs the converse operations of the transmitter 310 to recover the data 302 and 304. The repeater 350 generally re-transmits the data 302 and 304 to the receiver 340. Unlike conventional SDAR communication systems, the transmitter 310, the receiver 340 and the repeater 350 provide hardware and/or software to allow the SDAR communication system 300 to utilize a hierarchical modulation scheme to transmit and receive more digital data than conventional systems.

The SDAR transmitter 310 includes encoders 312 and 322. The audio, video, or other form of digital content to be transmitted comprises the primary data 302 and the secondary data 304, which are typically arranged as series of k-bit symbols. The primary data 302 contains primary, or first level (Level I) data and the secondary data 304 contains secondary, or second level (Level II) data. The encoders 312 and 322 encode the k bits of each symbol, as well as blocks of the k-bit symbols. It should be appreciated that separate encoders may be used to encode the blocks of k-bit symbols, for example, outer and inner encoders. The encoder 312 may encode a primary data stream using a block or a convolutional forward error correction (FEC) algorithm and the encoder 322 may encode a secondary data stream using a turbo coding algorithm or a low density parity check FEC algorithm. It is contemplated that other FEC encoding methods may be utilized to encode primary and secondary data streams, including, for example, Hamming codes, cyclic codes and Reed-Solomon (RS) codes.

Figure 6:
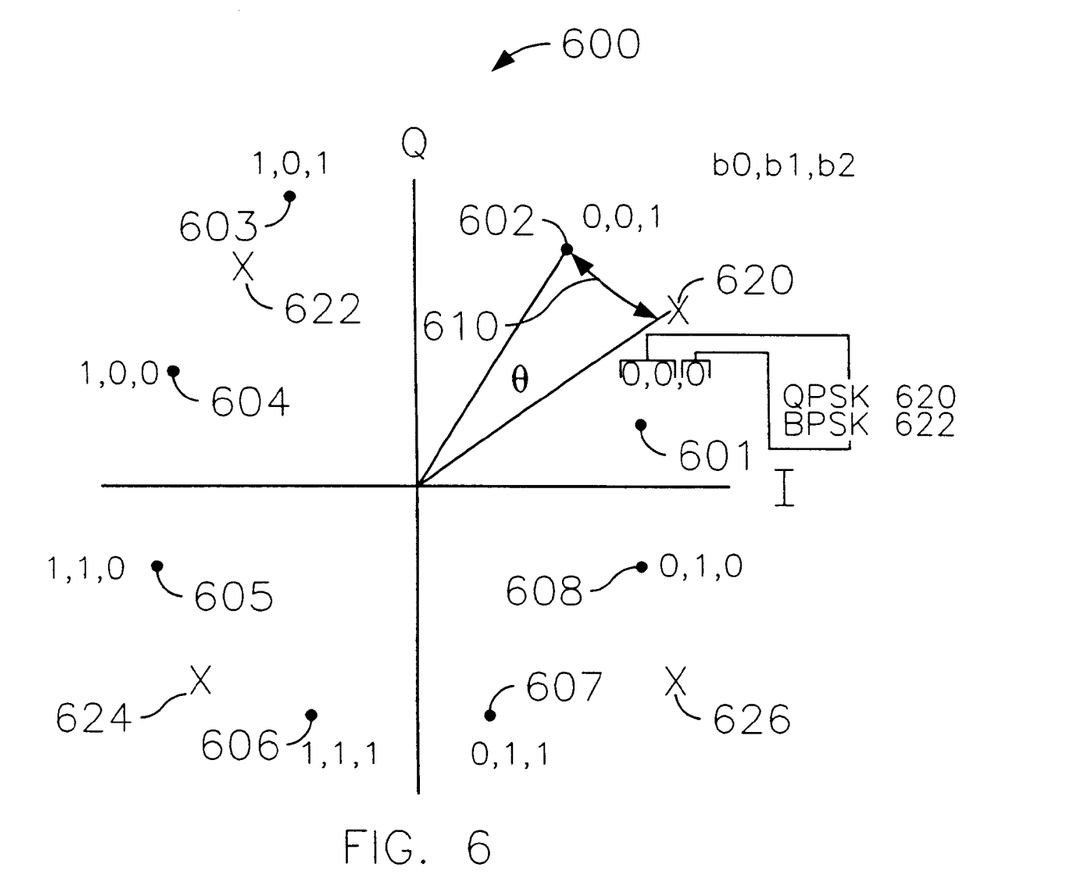
FIG. 6 is a diagrammatic view of a hierarchical 8-PSK constellation.

Again referring to FIG. 3, an interleaver 316 independently interleaves the two data streams and multiplexes the encoded secondary content data stream with the encoded primary content data stream to form a transmit data stream. This transmit data stream is passed to mapper 317, which maps the data stream into symbols composed of I and Q signals. The mapper 317 may be implemented as a look-up table, where sets of bits from the transmit signal are translated into I and Q components representing constellation points or symbols. FIG. 6 is representative of an exemplary embodiment of the present invention, in which a hierarchical modulation scheme is employed and the constellation points are in accordance with either a uniform or non-uniform 8-PSK constellation 600, where each phasor is represented by a three (3) bit symbol composed of I and Q signals.

Figure 4:
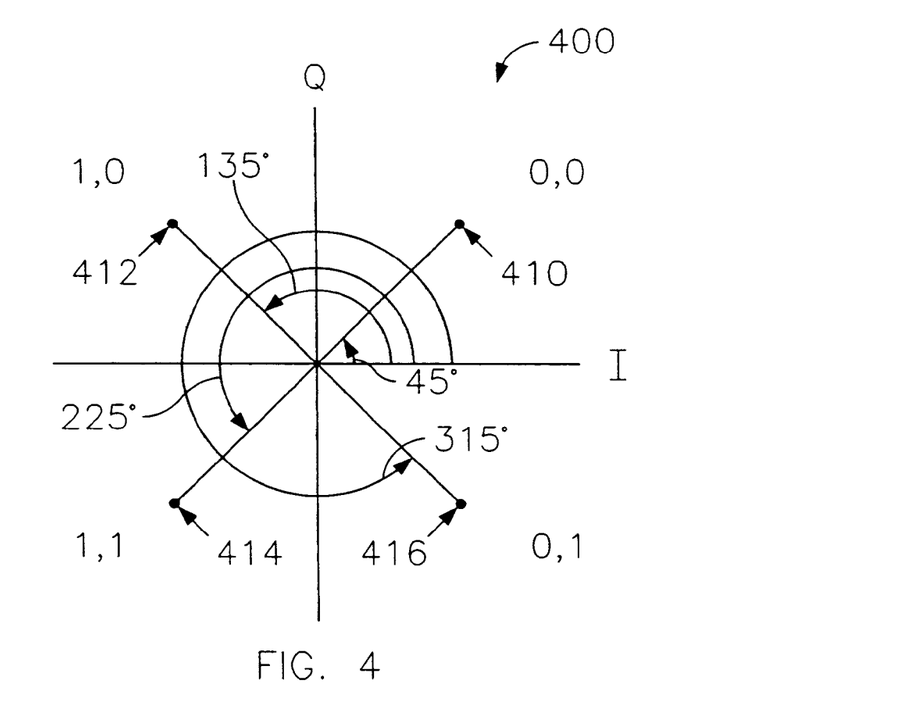
FIG. 4 is a diagrammatic view of a QPSK constellation.
Figure 5:
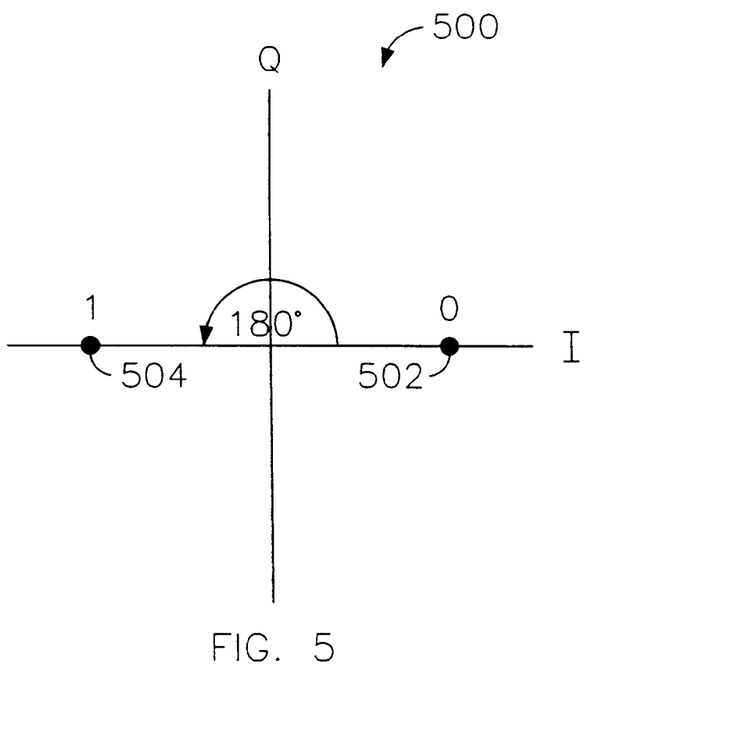
FIG. 5 is a diagrammatic view of a binary phase shift keying (BPSK) constellation.

FIG. 4 shows a QPSK constellation 400 for primary data having two (2) transmitted bits/symbol. Phasors "00", "10", "11", "01" correlate to a phase of 45 degrees, a phase of 135 degrees, a phase of 225 degrees and a phase of 315 degrees, respectively. FIG. 5 shows BPSK constellation 500 for secondary data having one (1) transmitted bit/symbol. Phasors "0" and "1" correlate to a phase of zero (0) and 180 degrees, respectively. When a secondary data symbol is added onto a primary data symbol, constellation 600 of FIG. 6 is illustrative of the resulting hierarchical modulation.

Constellation 600 may be perceived as two (2) sets of superimposed modulations—QPSK constellation 400 transmitting two (2) bits/symbol 620 combined with BPSK constellation 500 comprising one (1) bit/symbol. The first modulation is the primary QPSK data, which is represented by "X" marks 620, 622, 624, 626. In order to superimpose the secondary data onto the primary data, the primary QPSK data is phase offset by the additional, secondary data, which is represented by any of data points 601, 602, 603, 604, 605, 606, 607 and 608, depending on the phase offset. Positive phase offsets include points 602, 604, 606 and 608 and negative phase offsets include points 601, 603, 605 and 607.

Phase offset 610 is the offset angle relative to the QPSK symbol. As explained above, a typical QPSK constellation contains 45 degree, 135 degree, 225 degree and 315 degree points. The hierarchical data is represented by a phase offset relative to those four (4) degree points, and the phase offsets from the four (4) degree points represent a hierarchical (8-PSK) constellation. A uniform 8-PSK constellation is created when offset angle 610 is 22.5 degrees. Every other offset angle creates a non-uniform 8-PSK constellation. For example, a 15 degree phase offset relative to primary data phasors 620, 622, 624, 626 produces a phase offset correlative to phasors 601 ("000") or 602 ("001"), 603 ("101") or 604 ("100"), 605 ("110") or 606 ("111") and 607 ("011") or 608 ("010"), respectively. Gray coding is a method which may be used to make the bit assignments for the hierarchical constellation. For example, reference is made to the secondary data bit (b2). Instead of making b2=0 a negative offset and b2=1 a positive outset, the hierarchical constellation may be configured so as to increase the bit error rate (BER) performance (e.g., b2=1 can be made a negative offset). Gray coding ensures that if a symbol error occurs in an adjacent quadrant that only one bit error occurs.

The amount of the phase offset is equal to the amount of power in the secondary signal. The amount of energy in the secondary signal may or may not be equal to the amount of energy in the primary signal. As the phase offset 610 is increased, the energy in the secondary data signal is also increased. The performance degradation to the primary data signal is minimized by the perceived coding gain improvement as the phase offset 610 is increased. The application of the hierarchical phase modulation on top of an existing QPSK signal containing primary data causes the phase offset 610 to adjust either positively or negatively relative to the hierarchical data.

In general, a secondary data bit causes either a larger Q magnitude and smaller I magnitude or a larger I magnitude and smaller Q magnitude. By implementing FEC techniques within the encoders 312 and 322, the I and Q signals are used in conjunction with each other over a block of data. These techniques give the appearance that the primary data bits are spread over time, enabling the secondary data to appear somewhat orthogonal to the primary data bits. Simulations have shown that the impact of the secondary data on the primary data is somewhat orthogonal. For example, for a twenty (20) degree phase offset for secondary data, the primary data has a one (1) decibel (dB) degradation when using a rate 1/3 convolutional code with a constraint length of seven (7), followed by a (255, 223) RS block code (8 bits/symbol). However, when the primary data has no FEC coding, the impact of the twenty (20) degree phase offset is 4.1 dB. This data demonstrates a perceived coding improvement of 3.1 dB in the case where phase offset 610 is set to twenty (20) degrees.

Again referring to FIG. 3, the FEC coding technique implemented by the encoders 312 and 322 spreads the primary and secondary data over many QPSK symbols, which essentially spreads the energy over time and the I and Q bits. To overcome the unequal signal-to-noise ratio ("Eb/No") between primary data bits and secondary data bits, the amount of the phase offset 610 may be increased until the performance of the primary data is equal to the performance of the secondary data. However, as the phase offset 610 is increased, legacy receivers may have a difficult time acquiring and tracking the desired primary data signal. By spreading the second level bits over multiple symbols, spread spectrum coding techniques may be used to increase the amount of energy in the secondary bits. This allows the phase offset 610 to be adjusted and made more compatible with legacy receivers. Additionally, the use of second level data spreading reduces overall second level data throughput. Overall, several techniques may be utilized to maximize the performance of the secondary data. These techniques include: increasing the phase offset 610 to maximize the secondary data energy per symbol; using multiple symbols per secondary data bit; using more complex FEC algorithms and using a beam steering antenna to improve the performance of the secondary data (e.g., a higher gain directional antenna for stationary reception and a pointing/steering antenna for mobile reception).

Referring again to FIG. 3, after the mapper 317 translates the encoded and interleaved primary and secondary data streams into I and Q components, the I and Q components are modulated by modulator 318. Modulation enables both the primary data stream and the secondary data stream to be transmitted as a single transmission signal, via antenna 326, over single transmission channel 330. The primary data stream is modulated with the secondary data stream according to FIG. 6.

An increase in the capacity of the transmitted signal would not cause backwards compatibility problems with legacy receivers as long as the legacy receivers can interpret the first level data. Second generation receivers, however, are generally capable of interpreting both first and second level data. Techniques may be employed to minimize the degradation in the legacy receiver, including decreasing the phase offset 610 to limit the amount of the second level data energy per symbol, limiting the amount of time over which the second level data is transmitted and making the second level data energy appear as phase noise to the legacy receiver.

Referring back to FIG. 2, after modulator 318 modulates the first and second data streams (FIG. 6) to create a transmission signal, transmitter 213 uplinks the transmission signal to the communication satellites 212 and 214. The satellites 212 and 214, having a "bent pipe" design, receive the transmitted hierarchically modulated signal, perform frequency translation on the signal, and re-transmit, or broadcast, the signal to either one or more of the terrestrial repeaters 218 and 219 and/or the receivers 216 and 217.

As shown in FIG. 3, the terrestrial repeater 350 includes terrestrial receiving antenna 352, tuner 353, demodulator 354, de-interleaver 357, modulator 358 and frequency translator and amplifier 359. The demodulator 354 is capable of down-converting the hierarchically modulated downlinked signal to a time-division multiplexed bit stream. The de-interleaver 357 de-interleaves the received data and re-encodes the bit-stream in an orthogonal frequency division multiplexing (OFDM) format for terrestrial transmission. OFDM modulation divides the bit stream between a large number of adjacent subcarriers, each of which is modulated with a portion of the bit stream using one of the M-PSK, differential M-PSK (D-MPSK) or differential pi/4 M-PSK (pi/4 D-MPSK) modulation techniques. Accordingly, if a hierarchically modulated signal is transmitted to one or both of the terrestrial repeaters 218 and 219 (FIG. 2), the terrestrial repeaters 218 and 219 receive the signal, decode the signal, re-encode the signal using OFDM modulation and transmit the signal to one or more receivers 216 and 217. Because the signal contains both the first and second level data, the terrestrial signal maintains second level data bit spreading over multiple symbols.

The SDAR receiver 340 contains hardware (e.g., a chipset) and/or software to process secondary data of any received hierarchically modulated signals that are gray coded 8-PSK hierarchically modulated signals. The receiver 340 may also be configured to process primary data of any received hierarchically modulated signals. The receiver 340 includes one or more antennas 342 for receiving signals transmitted from either of the communication satellites 212 and 214 and/or the terrestrial repeaters 218 and 219 (FIG. 2). The receiver 340 includes a tuner 343 to translate the received signals to baseband. Separate tuners may be used to downmix the signals received from the communication satellites 212 and 214 and/ or the signals received from the terrestrial repeaters 218 and 219. It is also envisioned that one tuner may be used to downmix both the signals transmitted from the satellites 212 and 214 and/or the signals transmitted from the repeaters 218 and 219.

Figure 8:
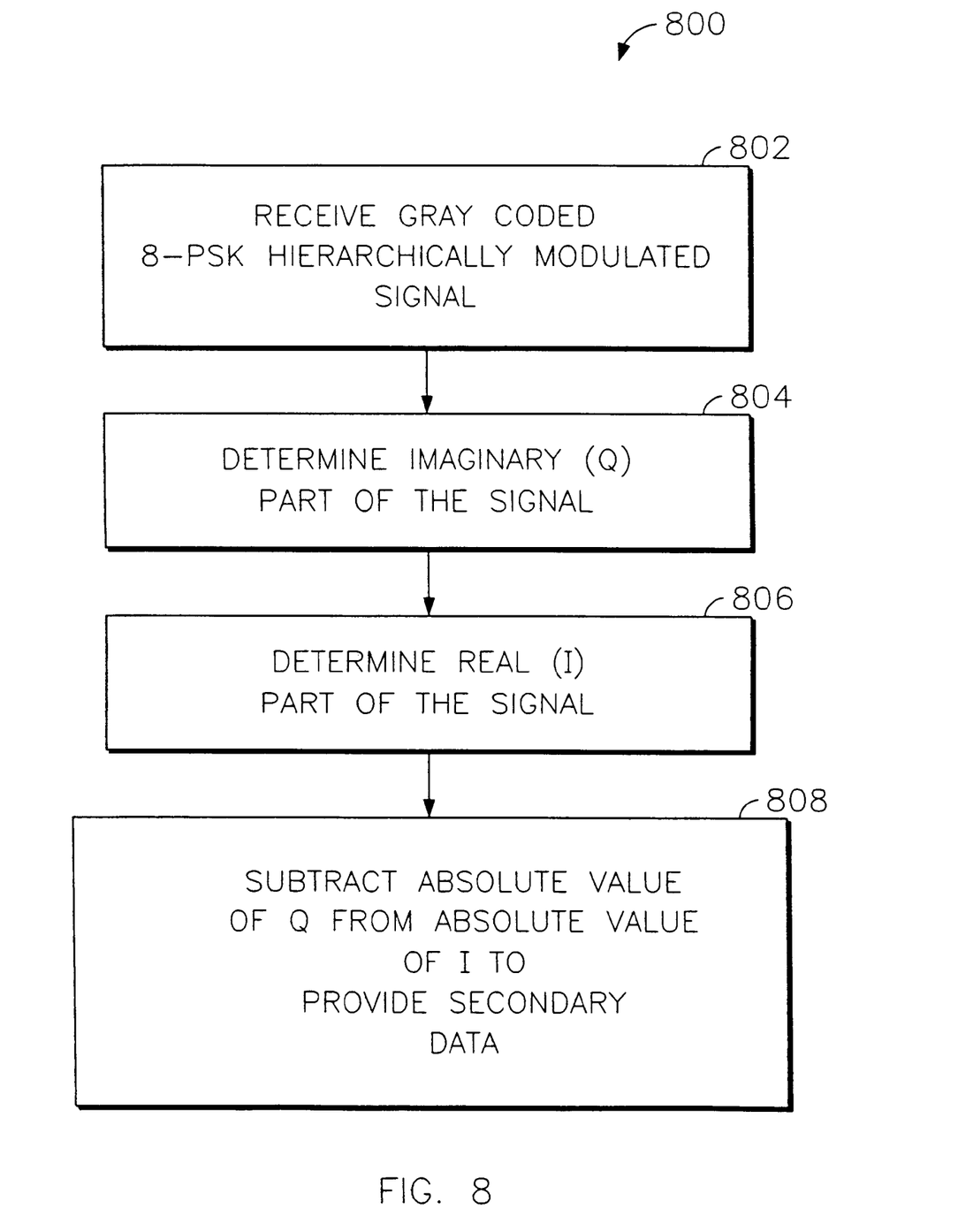
FIG. 8 is a flowchart of an exemplary routine for demodulating secondary data from a hierarchically modulated signal, according to one embodiment of the present invention.

Once the received signal is translated to baseband, the signal is demodulated by the demodulator 344 to produce the I and Q components. The secondary data can then be recovered, according to the present invention, from the I and Q components. More specifically, with reference to FIG. 8, a routine 800 is depicted that allows for demodulation of secondary data from a gray coded 8-phase shift key (8-PSK) hierarchically modulated signal. As shown in step 802, the gray coded 8-PSK signal is received. Next, in step 804, an imaginary (Q) part of the signal is determined. Next, in step 806, a real (I) part of the signal is determined. Then, in step 808, the absolute value of the imaginary portion of the signal is subtracted from the absolute value of the real part of the signal to provide the secondary data. The digital bits associated with the secondary data stream are then passed to a deinterleaver 346 and to a decoder 348. The decoder 348 employs known bit and block decoding methods to decode the secondary bit stream to provide the secondary data 304. In other embodiments of the present invention, multiple decoders may be used, e.g., outer and inner decoders. The receiver 340 may also use a feed forward correction technique to improve its detection of the secondary data.

Figure 7:
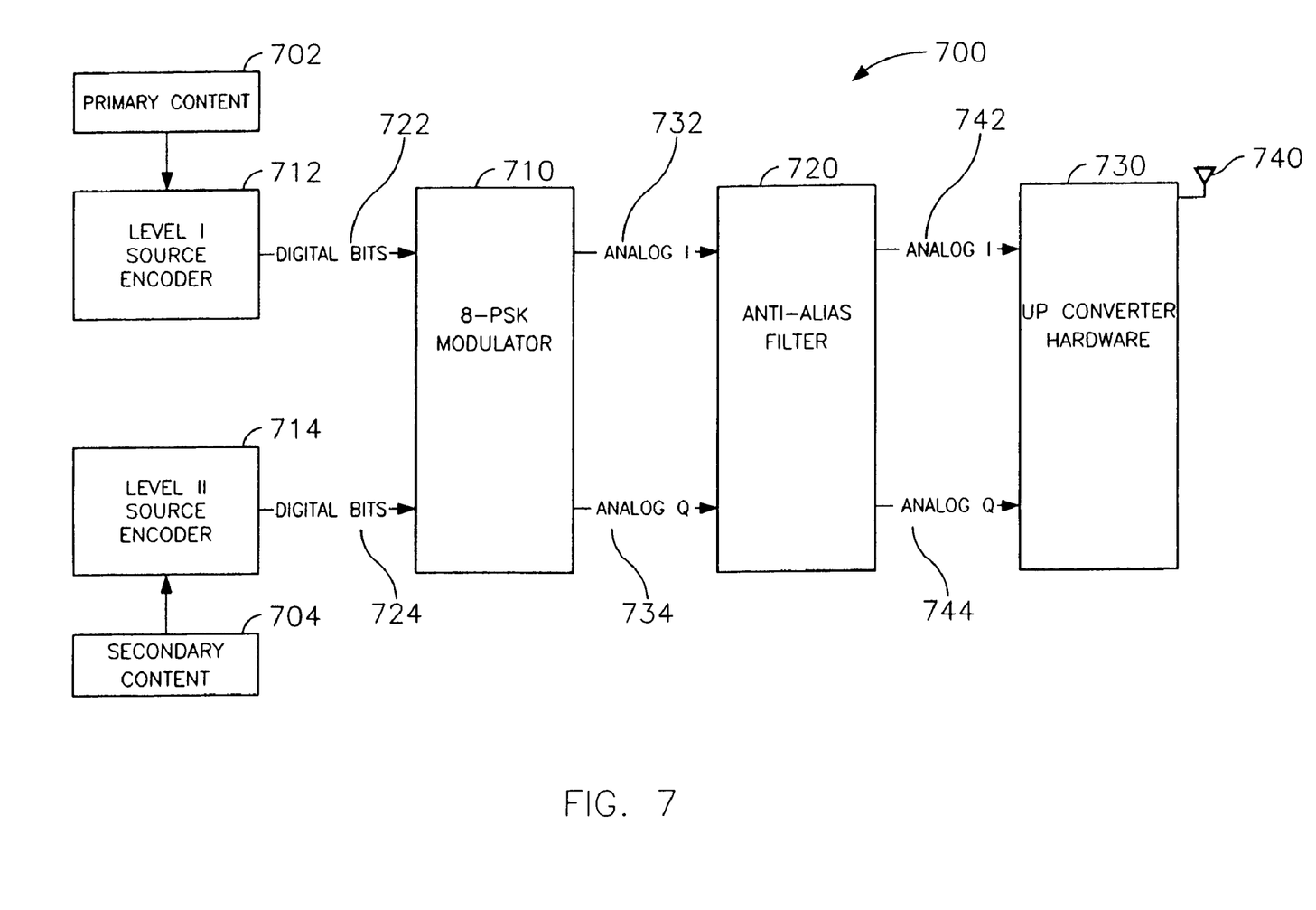
FIG. 7 is a block diagram of an exemplary SDAR transmitter capable of use in the system of FIG. 6.

FIG. 7 depicts an SDAR transmitter 700 shown that is provided primary content 702 and secondary content 704 which is supplied to Level I source encoder 712 and Level II source encoder 714, respectively. Digital bits 722 and 724, from encoders 712 and 714, are input to a 8-PSK modulator 710 to be converted to analog I and Q signals 732 and 734, respectively, that are input to anti-alias filter 720. The anti-alias filter 720 performs the operation necessary to provide analog I and analog Q signals 742 and 744 that become the correct hierarchical transmission I and Q signals that are ultimately transmitted, by up-converter 730, as broadcast radio frequency signal (or RF) 740.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A method for demodulating secondary data from a hierarchically modulated signal, comprising the steps of:
    receiving a gray coded eight phase shift key (8-PSK) hierarchically modulated signal that includes primary data and secondary data;
    determining an imaginary portion of the signal;
    determining a real portion of the signal; and
    subtracting an absolute value of the real portion of the signal from an absolute value of the imaginary portion of the signal to provide the secondary data or subtracting an absolute value of the imaginary portion of the signal from an absolute value of the real portion of the signal to provide the secondary data.

2. The method of claim 1, wherein the gray coded 8-PSK hierarchically modulated signal is a uniform gray coded 8-PSK hierarchically modulated signal.

3. The method of claim 1, wherein the gray coded 8-PSK hierarchically modulated signal is a non-uniform gray coded 8-PSK hierarchically modulated signal.

4. The method of claim 1, wherein the secondary data is low priority data and the primary data is high priority data.

5. The method of claim 1, wherein the secondary data is encoded with a different forward error correction scheme than the primary data.

6. The method of claim 1, wherein a digital one is indicated when the absolute value of the imaginary portion of the signal is greater than the absolute value of the real portion of the signal.

7. The method of claim 1, wherein a digital zero is indicated when the absolute value of the imaginary portion of the signal is less than the absolute value of the real portion of the signal.

8. The method of claim 1, wherein a digital one is indicated when the absolute value of the real portion of the signal is greater than the absolute value of the imaginary portion of the signal.

9. The method of claim 1, wherein a digital zero is indicated when the absolute value of the real portion of the signal is less than the absolute value of the imaginary portion of the signal.

10. A receiver for demodulating secondary data from a received hierarchically modulated signal, comprising:
    a tuner for down-converting a received gray coded eight phase shift key (8-PSK) hierarchically modulated signal that includes primary data and secondary data; and
    a demodulator for demodulating the gray coded 8-PSK hierarchically modulated signal, wherein the demodulator determines an imaginary portion and a real portion of the signal, and wherein the demodulator subtracts an absolute value of the real portion of the signal from an absolute value of the imaginary portion of the signal to provide the secondary data.

11. The receiver of claim 10, wherein the gray coded 8-PSK hierarchically modulated signal is a uniform gray coded 8-PSK hierarchically modulated signal.

12. The receiver of claim 10, wherein the gray coded 8-PSK hierarchically modulated signal is a non-uniform gray coded 8-PSK hierarchically modulated signal.

13. The receiver of claim 10, wherein the secondary data is low priority data and the primary data is high priority data.

14. The receiver of claim 10, wherein the secondary data is encoded with a different forward error correction scheme than the primary data.

15. The receiver of claim 10, wherein a digital one is indicated when the absolute value of the imaginary portion of the signal is greater than the absolute value of the real portion of the signal.

16. The receiver of claim 10, wherein a digital zero is indicated when the absolute value of the imaginary portion of the signal is less than the absolute value of the real portion of the signal.

17. The receiver of claim 10, wherein a digital one is indicated when the absolute value of the real portion of the signal is greater than the absolute value of the imaginary portion of the signal.

18. The receiver of claim 10, wherein a digital zero is indicated when the absolute value of the real portion of the signal is less than the absolute value of the imaginary portion of the signal.

19. A receiver for demodulating secondary data from a received hierarchically modulated signal, comprising:
    a tuner for down-converting a received gray coded eight phase shift key (8-PSK) hierarchically modulated signal that includes primary data and secondary data;
    a filter including an input coupled to an output of the tuner; and
    a demodulator coupled to an output of the filter, wherein the demodulator determines an imaginary portion and a real portion of the gray coded 8-PSK hierarchically modulated signal, and wherein the demodulator subtracts an absolute value of the real portion of the signal from an absolute value of the imaginary portion of the signal to provide the secondary data.

20. The receiver of claim 19, wherein the gray coded 8-PSK hierarchically modulated signal is a uniform gray coded 8-PSK hierarchically modulated signal.

21. The receiver of claim 19, wherein the gray coded 8-PSK hierarchically modulated signal is a non-uniform gray coded 8-PSK hierarchically modulated signal.

22. The receiver of claim 19, wherein the secondary data is low priority data and the primary data is high priority data.

23. The receiver of claim 19, wherein the secondary data is encoded with a different forward error correction scheme than the primary data.

24. The receiver of claim 19, wherein a digital one is indicated when the absolute value of the imaginary portion of the signal is greater than the absolute value of the real portion of the signal.

25. The receiver of claim 19, wherein a digital zero is indicated when the absolute value of the imaginary portion of the signal is less than the absolute value of the real portion of the signal.

26. The receiver of claim 19, wherein a digital one is indicated when the absolute value of the real portion of the signal is greater than the absolute value of the imaginary portion of the signal.

27. The receiver of claim 19, wherein a digital zero is indicated when the absolute value of the real portion of the signal is less than the absolute value of the imaginary portion of the signal.

28. The receiver of claim 19, further comprising:
a source decoder for decoding the secondary data.

* * * * *